(12) United States Patent
Gaw et al.

(10) Patent No.: US 11,872,859 B1
(45) Date of Patent: Jan. 16, 2024

(54) TOP MOUNT HYDRAULIC BUMP STOP

(71) Applicant: GM GLOBAL TECHNOLOGY OPERATIONS LLC, Detroit, MI (US)

(72) Inventors: Sean Gaw, Troy, MI (US); Douglas Arbour, Brighton, MI (US); Dominick Sterley, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 17/879,952

(22) Filed: Aug. 3, 2022

(51) Int. Cl.
*B60G 15/06* (2006.01)

(52) U.S. Cl.
CPC ...... *B60G 15/067* (2013.01); *B60G 2202/312* (2013.01); *B60G 2204/128* (2013.01); *B60G 2204/43* (2013.01); *B60G 2204/4502* (2013.01); *B60G 2206/41* (2013.01); *B60G 2206/73* (2013.01)

(58) Field of Classification Search
CPC .......... B60G 2206/41; B60G 2204/128; B60G 15/067
See application file for complete search history.

(56) References Cited

U.S. PATENT DOCUMENTS

| | | | | |
|---|---|---|---|---|
| 4,065,143 A * | 12/1977 | Iida | ................ | B62D 55/1125 |
| | | | | 280/43.23 |
| 5,899,472 A * | 5/1999 | Burke | ................ | B60G 21/073 |
| | | | | 280/5.506 |
| 6,247,563 B1 * | 6/2001 | De Carbon | ................ | F16F 1/32 |
| | | | | 188/322.22 |
| 6,260,832 B1 * | 7/2001 | Vignocchi | ................ | F16F 9/44 |
| | | | | 188/322.22 |
| 6,540,052 B2 * | 4/2003 | Fenn | ................ | F16F 9/348 |
| | | | | 188/322.22 |
| 6,616,160 B2 * | 9/2003 | Tadano | ................ | B60G 15/067 |
| | | | | 280/124.147 |
| 7,178,795 B2 * | 2/2007 | Huprikar | ................ | B60G 15/067 |
| | | | | 267/141.1 |
| 9,682,605 B2 * | 6/2017 | Ankney | ................ | F16F 9/516 |
| 9,975,388 B2 * | 5/2018 | Brown | ................ | B60G 15/067 |
| 11,305,603 B2 * | 4/2022 | Kubota | ................ | B60G 15/12 |
| 11,400,790 B2 * | 8/2022 | Rajan | ................ | B60G 17/0272 |
| 11,479,072 B2 * | 10/2022 | Parrino | ................ | B60G 17/0272 |
| 11,639,736 B2 * | 5/2023 | Song | ................ | F16C 33/102 |
| | | | | 384/291 |
| 11,668,347 B2 * | 6/2023 | Kang | ................ | F16C 17/04 |
| | | | | 384/477 |
| 2002/0171222 A1 * | 11/2002 | Tadano | ................ | B60G 15/067 |
| | | | | 280/124.155 |

(Continued)

FOREIGN PATENT DOCUMENTS

| | | | | |
|---|---|---|---|---|
| DE | 102010036238 A1 * | 3/2012 | .......... | B60G 15/067 |
| FR | 3117943 A3 * | 6/2022 | | |

(Continued)

*Primary Examiner* — Paul N Dickson
*Assistant Examiner* — Maxwell L Meshaka

(57) ABSTRACT

A top mount assembly includes an attachment bracket having a flange section, a piston rod mount section, and a cylinder section, the flange section includes a plurality of apertures for receiving a plurality of fastener bolts, the piston rod mount section being configured to receive a piston rod, and the cylinder section of the attachment bracket includes an annular chamber that receives an annular working piston.

20 Claims, 5 Drawing Sheets

(56) References Cited

U.S. PATENT DOCUMENTS

| | | | |
|---|---|---|---|
| 2005/0133322 A1* | 6/2005 | Huprikar | B60G 15/067 188/321.11 |
| 2010/0109277 A1* | 5/2010 | Furrer | F16F 9/466 280/124.161 |
| 2016/0185173 A1* | 6/2016 | Brown | B60G 15/067 267/292 |
| 2016/0243917 A1* | 8/2016 | Ankney | F16F 9/516 |
| 2020/0307341 A1* | 10/2020 | Kubota | F16F 9/096 |
| 2021/0237530 A1* | 8/2021 | Rajan | F16C 19/163 |
| 2022/0065298 A1* | 3/2022 | Kang | B60G 15/067 |
| 2022/0090624 A1* | 3/2022 | Song | F16C 33/102 |
| 2022/0097470 A1* | 3/2022 | Parrino | B60G 13/08 |
| 2022/0144036 A1* | 5/2022 | Mangelschots | F16F 9/3257 |
| 2023/0056209 A1* | 2/2023 | Oh | B60G 15/068 |

FOREIGN PATENT DOCUMENTS

| | | | | |
|---|---|---|---|---|
| WO | WO-2004082968 A1 * | 9/2004 | | B60G 11/32 |
| WO | WO-2009043656 A1 * | 4/2009 | | B60G 15/067 |

* cited by examiner

TOP MOUNT HYDRAULIC BUMP STOP

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a device that dampens jounce loads of a suspension using a hydraulic top mount bump stop.

The top mount is a standard component integrated into the shock module that isolates noise and vehicle harshness from road inputs/loads from the cab of the vehicle. A jounce shock is a dynamic load damping device that is mounted to the frame to dampen large load inputs due to hitting large potholes or off road wash out troughs. This top mount assembly of the present disclosure integrates the top mount with the jounce shock to reduce load inputs, eliminate external brackets and free up package space.

SUMMARY

A top mount assembly includes an attachment bracket having a flange section, a piston rod mount section, and a cylinder section. The flange section includes a plurality of apertures for receiving a plurality of fastener bolts for mounting the attachment bracket to a vehicle body or frame. The piston rod mount section is configured to receive a piston rod of a damper, and the cylinder section of the attachment bracket includes a chamber that receives a working piston, the working piston can include a piston chamber and a valve plate that separates the piston chamber from the chamber of the cylinder section and further includes a separating piston in the piston chamber.

According to a further aspect, the piston rod mount section includes a cavity within the attachment bracket, a mount assembly is received in the cavity and includes a cylindrical metal housing and a retainer plate supported within the cylindrical metal housing by an elastomeric isolator, the retainer plate includes a central opening configured to receive a piston rod.

According to another aspect, the retainer plate is supported within the cylindrical metal housing by two layers of elastomeric material.

According to a further aspect, the chamber of the cylinder section and the working piston are annular.

According to still another aspect, the working piston protrudes from the cavity of the cylinder section.

According to another aspect, the valve plate is mounted in an end of the piston chamber of the working piston.

According to another aspect, the valve plate includes a plurality of apertures therein.

According to a further aspect, a top mount assembly, includes: an attachment bracket having a flange section, a piston rod mount section, and a cylinder section. The flange section includes a plurality of apertures for receiving a plurality of fastener bolts. The piston rod mount section is configured to receive a piston rod, and the cylinder section of the attachment bracket includes an annular chamber that receives an annular working piston. A remote reservoir is in communication with the annular chamber and includes a separating piston within the remote reservoir.

The top mount assembly is implemented in a vehicle suspension system. The suspension system includes a damper with piston rod that is connected to the piston rod mount section. A suspension spring is seated against the flange section.

Further areas of applicability of the present disclosure will become apparent from the detailed description, the claims and the drawings. The detailed description and specific examples are intended for purposes of illustration only and are not intended to limit the scope of the disclosure.

Current production hydraulic bump stops are mounted externally to the load path of the shock absorber where higher loads occur due to the motion ratio of the suspension. The top mount of the present disclosure is in line with the load path of the shock absorber producing lower loads with the same benefit as the external bump stop. Also, the top mount of the present disclosure requires less bracketry and structure.

This top mount of the present disclosure replaces a typical microcellular urethane jounce bumper, that is part of a shock assembly, to dampen compression/jounce load that can occur from hitting a large pothole. The top mount assembly is hydraulic and utilizes shock fluid and valving to dampen much higher loads than a MCU jounce bumper can.

The top mount assembly of the present disclosure integrates the top mount with the jounce shock to reduce load inputs, eliminate external brackets and free up package space.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 3:
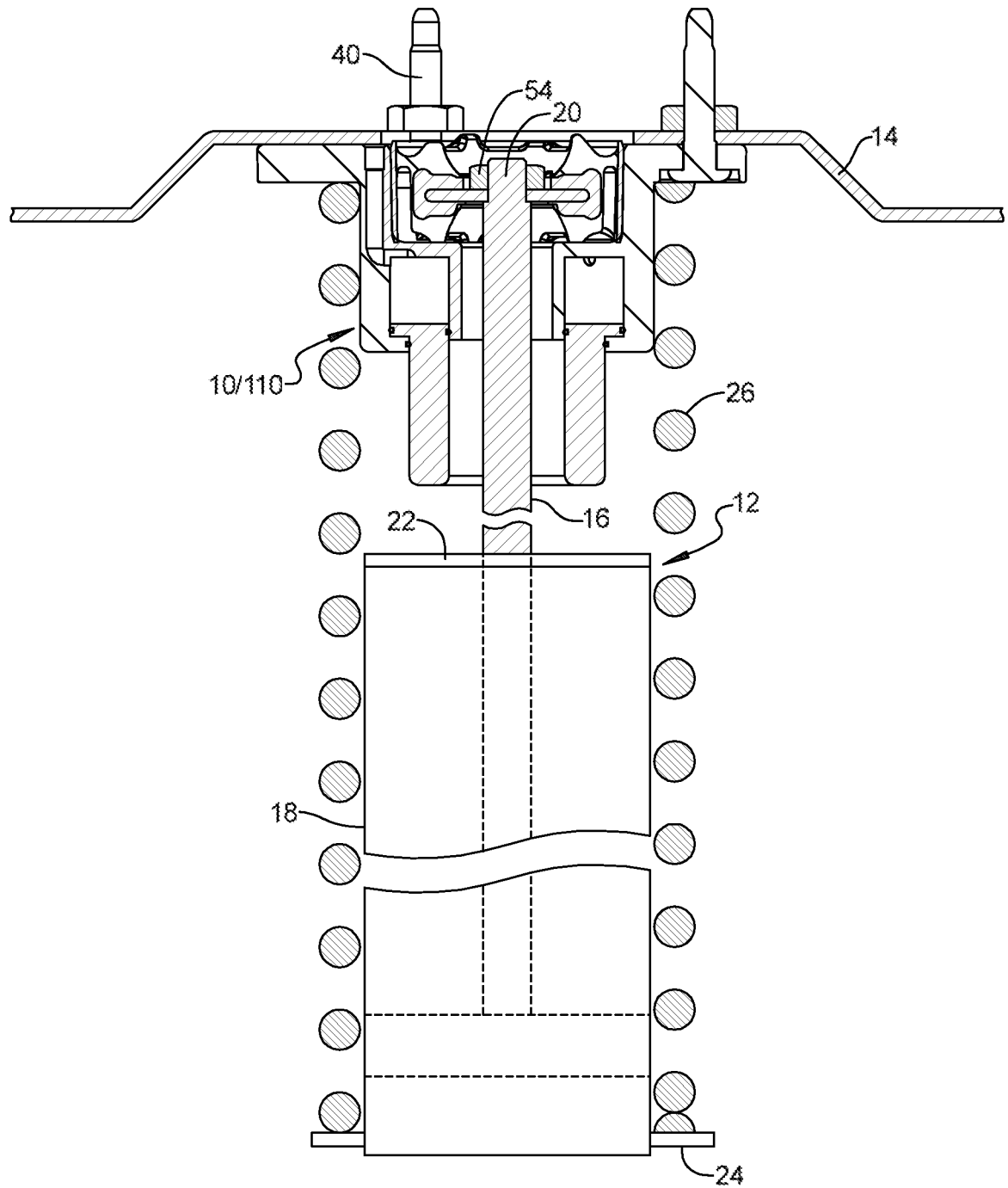
FIG. 3 is a schematic view of a suspension system incorporating the top mount hydraulic bump stop according to the principles of the present disclosure.

With reference to FIG. 3, a top mount assembly 10 according to the principles of the present disclosure is illustrated. The top mount assembly 10 attaches a hydraulic damper 12 (e.g., a strut or shock absorber) to a vehicular frame or body 14. The lower end of the damper 12 (not illustrated) is attached to a wheel assembly by any suitable manner.

The damper 12 includes a reciprocating piston rod 16 extending from an upper end of a reservoir tube 18. As is known in the art, a valved piston is mounted to a lower end of the piston rod 16 in a fluid-filled cylinder (not illustrated) housed by the damper 12. The piston rod 16 preferably terminates in a reduced-diameter threaded portion 20. A bump plate 22 having a central opening for receiving the piston rod 16 can be secured to the upper end of the reservoir tube 18.

A lower spring seat 24 is secured to the reservoir tube 18 by any suitable means. A helical or coil suspension spring 26 is seated at its lower end on the lower spring seat 24 and spirals upwardly around the damper 12. An elastomeric insulator 28 can be provided between the lower coil of the suspension spring 26 and the lower spring seat 24. The upper end of the suspension spring 26 engages the top mount assembly 10 as described below. With the suspension spring 26 operatively mounted between the lower spring seat 24 and the top mount assembly 10, the vehicle body is resiliently supported or suspended so that road inputs (bumps, roadway irregularities, etc.) encountered by the wheel assembly do not detract from the ride.

Figure 1:
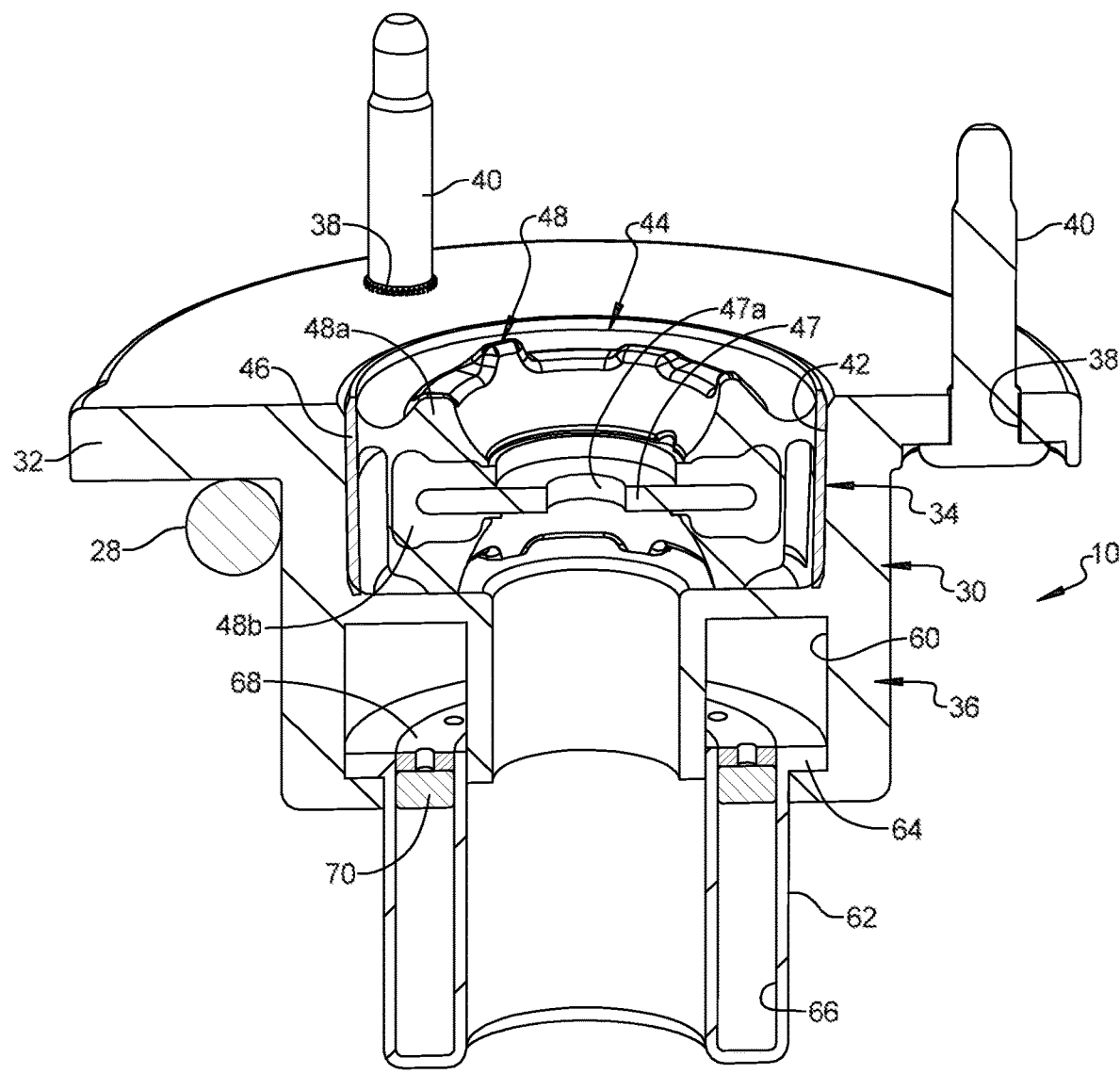
FIG. 1 is a cross-sectional view of a top mount hydraulic bump stop according to a first embodiment.

With reference to FIG. 1, the top mounting assembly 10 includes an attachment bracket 30 having a flange section 32, a piston rod mount section 34, and a cylinder section 36. The flange section 32 includes a plurality of apertures 38 for receiving a plurality of fastener bolts 40 and corresponding nuts that are mounted to the vehicle frame or body 14. The flange section 32 is sized to seat the upper coil of the suspension spring 26. The piston rod mount section includes a cavity 42 within the attachment bracket 30. A mount assembly 44 is received in the cavity 42. The mount assembly 44 includes a cylindrical metal housing 46 and a retainer plate 47 supported within the cylindrical metal housing 46 by an isolator 48. The isolator 48 can encapsulate the retainer plate 47 and be molded to the cylindrical metal housing 46. The isolator 48 can include one or more different layers of rubber or other elastomeric material 48a, 48b. The retainer plate 47 includes a central opening 47a for receiving a threaded portion 20 of the piston rod 16. A nut 54 is threaded on the threaded portion 20 to secure the retainer plate 47 to the piston rod 16, as best shown in FIG. 1.

When the top mount assembly 10 is assembled on a vehicle, the weight of the vehicle preloads the suspension spring 26. As the reservoir tube 18 moves upwardly due to road inputs, the suspension spring 26 is compressed. This deflection provides a degree of motion to reduce transmission of vibration to the frame or body 14, thereby reducing ride harshness.

The cylinder section 36 of the attachment bracket defines a chamber 60 that receives a working piston 62. The working piston 62 extends outward from the chamber 60 and includes a flange portion 64 that retains the working piston 62 in the chamber 60. The working piston 62 can include a piston chamber 66 and a valve plate 68 that separates the piston chamber 66 from the chamber 60 of the cylinder section 36. A separating piston 70 is in the piston chamber 66. The chamber 60 and piston chamber 66 are charged with nitrogen gas or other gas, as desired to provide a proper jounce response. The cylinder section 36 and the working piston 62 are annular and each concentrically surround the piston rod 16

In an assembled condition, an end of the working piston 62 opposes the upper end of the reservoir tube 18 so that the top mount 10 serves as a jounce bumper. In particular, as the vehicle travels down a road, the suspension spring 26 and the damper 12 absorb and react to vibration inputs transmitted to the suspension system by the road. When the wheel hits a large bump, the suspension spring 26 and the damper 12 can deflect to allow the upper end of the reservoir tube 18 to engage the protruding working piston 62 of the top mount assembly 10. The top mount assembly 10 further absorbs the impact of the reservoir tube 18 against the working piston 62 by compressing the gas within the chamber 60 and the piston chamber 66 of the working piston 62.

The top mount assembly 10 replaces a typical microcellular urethane jounce bumper, that is part of a shock assembly, to dampen compression/jounce loads that can occur from hitting a large pothole. This top mount assembly 10 is hydraulic and utilizes shock fluid and valving to dampen much higher loads than an MCU jounce bumper can.

Figure 2A:
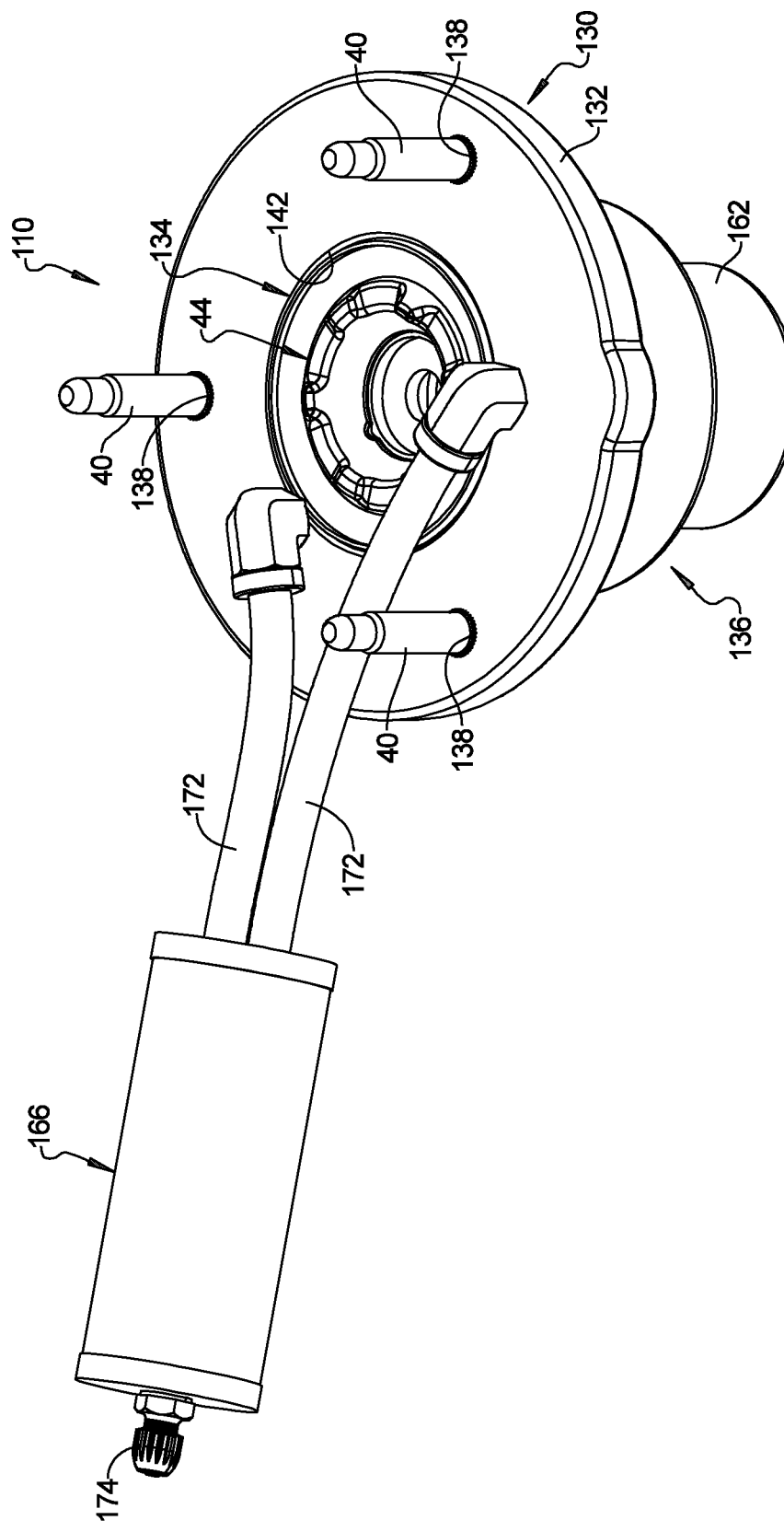
FIG. 2A is a perspective view of a top mount hydraulic bump stop according to a second embodiment.
Figure 2B:
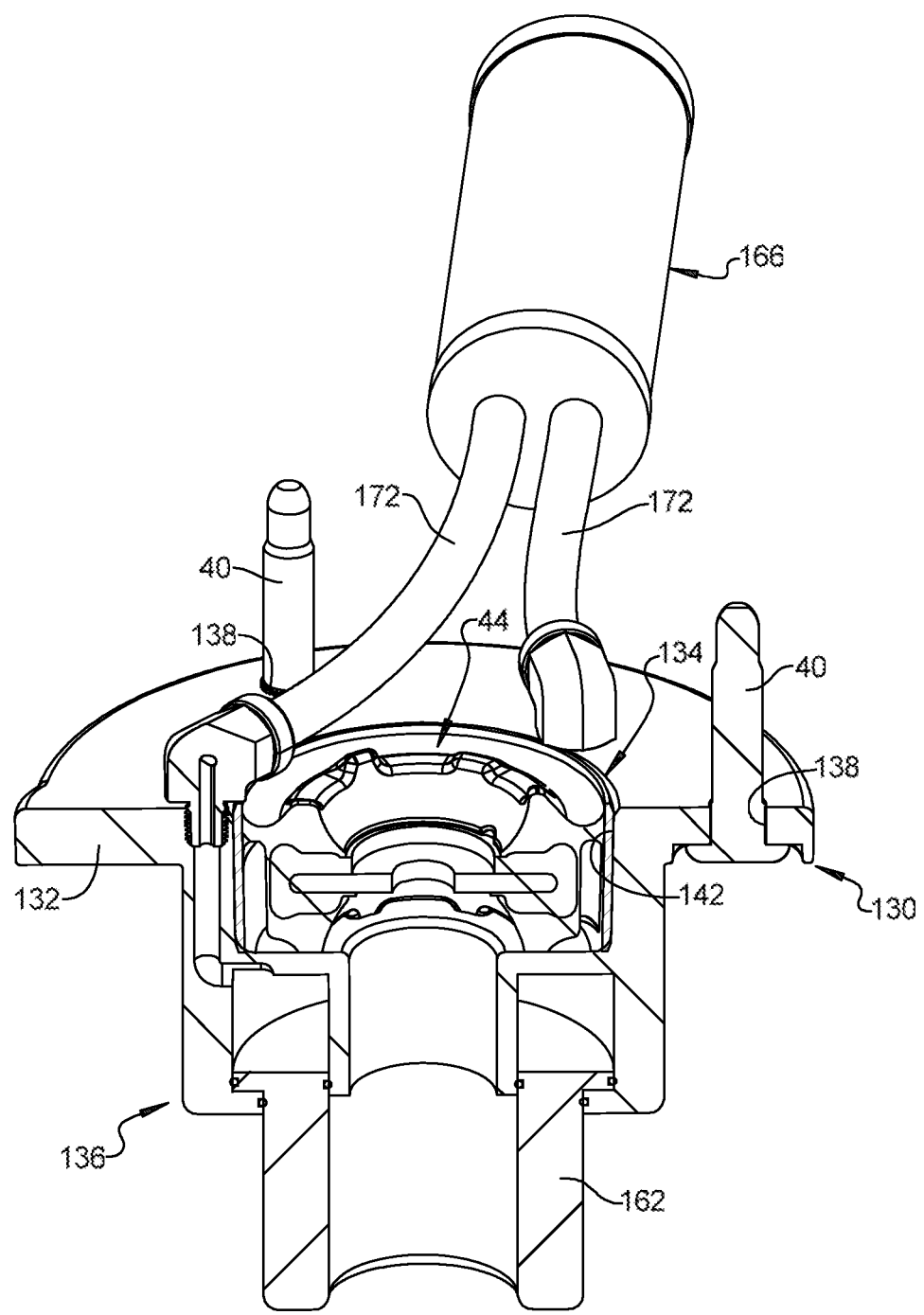
FIG. 2B is a cross-sectional view of the top mount hydraulic bump stop according to the second embodiment.
Figure 2C:
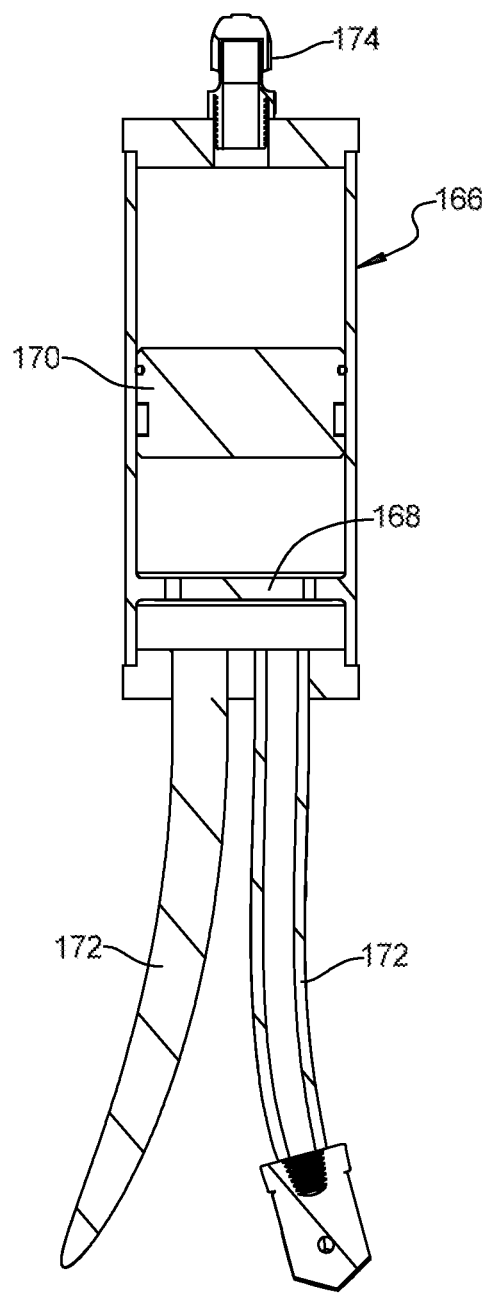
FIG. 2C is a cross-sectional view of the remote reservoir of the top mount hydraulic bump stop according to the second embodiment.

With reference to FIGS. 2A-2C, an alternative top mounting assembly 110 includes an attachment bracket 130 having a flange section 132, a piston rod mount section 134, and a cylinder section 136. The flange section 132 includes a plurality of apertures 138 for receiving a plurality of fastener bolts 40 and corresponding nuts that are mounted to the vehicle frame or body 14. The flange section 132 is sized to seat the upper coil of the suspension spring 24. The piston rod mount section includes a cavity 142 within the attachment bracket 130. A mount assembly 44 is received in the cavity 142. The mount assembly 44 can be the same as the mount assembly 44 shown and described with reference to FIG. 1 and includes a cylindrical metal housing 46 and a retainer plate 47 supported within the cylindrical metal housing 46 by an isolator 48. The isolator 48 can encapsulate the retainer plate 47 and be molded to the cylindrical metal housing 46. The isolator 48 can include one or more different layers of rubber or other elastomeric material 48a, 48b, as shown in FIG. 1. The retainer plate 47 includes a central opening 47a for receiving a threaded portion 20 of the piston rod 16. A nut 54 is threaded on the threaded portion 20 to secure the retainer plate 47 to the piston rod 16.

The cylinder section 136 of the attachment bracket defines a chamber 160 that receives a piston 162 similar to the chamber 60 and piston 62 shown in FIG. 1. The piston 162 includes a flange portion that retains the piston 162 in the chamber 160. The piston 162 can be hollow like the piston 62 or can be solid. A remote reservoir 166 is in communication with the chamber 160 via one or more tubes 172. The remote reservoir 166 can include a valve plate or valving 168 and a separating piston 170 in the remote reservoir 166. Alternatively, the tubes 172 can serve as the valving that limits gas flow from the chamber 160 to the remote reservoir. The chamber 160 and remote reservoir 166 are charged with nitrogen gas or other gas, as desired to provide a proper jounce response. The movement of the piston 162 into the chamber 160 compresses the gas and forces the gas through the valving into the remote reservoir 166. When the jounce force is removed, the gasses within the chamber 160 and the remote reservoir 166 return to equilibrium.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A top mount assembly, comprising:
an attachment bracket having a flange section, a piston rod mount section, and a cylinder section,
the flange section including a plurality of apertures for receiving a plurality of fastener bolts;
the piston rod mount section configured to receive a piston rod; and
the cylinder section of the attachment bracket includes a chamber that receives a working piston, the working piston includes a piston chamber and a valve plate that separates the piston chamber from the chamber of the cylinder section and further includes a separating piston in the piston chamber.

2. The top mount assembly according to claim 1, the piston rod mount section includes a cavity within the attachment bracket, a mount assembly is received in the cavity and includes a cylindrical metal housing and a retainer plate supported within the cylindrical metal housing by an elastomeric isolator, the retainer plate includes a central opening configured to receive a piston rod.

3. The top mount assembly according to claim 2, wherein the retainer plate is supported within the cylindrical metal housing by two layers of elastomeric material.

4. The top mount assembly according to claim 1, wherein the chamber of the cylinder section and the working piston are annular.

5. The top mount assembly according to claim 4, wherein the working piston protrudes from the cavity of the cylinder section.

6. The top mount assembly according to claim 4, wherein the valve plate is mounted in an end of the piston chamber of the working piston.

7. The top mount assembly according to claim 1, wherein the valve plate includes a plurality of apertures therein.

8. A top mount assembly, comprising:
an attachment bracket having a flange section, a piston rod mount section, and a cylinder section,
the flange section including a plurality of apertures for receiving a plurality of fastener bolts;
the piston rod mount section configured to receive a piston rod, and
the cylinder section of the attachment bracket includes an annular chamber that receives an annular working piston;
a remote reservoir in communication with the annular chamber and including a separating piston within the remote reservoir.

9. The top mount assembly according to claim 8, the piston rod mount section includes a cavity within the attachment bracket, a mount assembly is received in the cavity and includes a cylindrical metal housing and a retainer plate supported within the cylindrical metal housing by an elastomeric isolator, the retainer plate includes a central opening configured to receive a piston rod.

10. The top mount assembly according to claim 9, wherein the retainer plate is supported within the cylindrical metal housing by two layers of elastomeric material.

11. The top mount assembly according to claim 8, wherein the working piston protrudes from the cavity of the cylinder section.

12. The top mount assembly according to claim 8, wherein a valve plate is mounted in an end of the remote reservoir.

13. The top mount assembly according to claim 12, wherein the valve plate includes a plurality of apertures therein.

14. A vehicle suspension system, comprising:
a damper configured to be connected between a vehicle body and a suspension arm, the damper including a reservoir tube and a piston rod connected to a piston within the reservoir tube;
a suspension spring supported by the reservoir tube and disposed against a top mount assembly,
the top mount assembly includes an attachment bracket having a flange section, a piston rod mount section, and a cylinder section,
the flange section includes a plurality of apertures for receiving a plurality of fastener bolts,
the piston rod mount section being configured to receive a piston rod, and
the cylinder section of the attachment bracket includes an annular chamber that receives an annular working piston.

15. The top mount assembly according to claim 14, the piston rod mount section includes a cavity within the attachment bracket, a mount assembly is received in the cavity and includes a cylindrical metal housing and a retainer plate supported within the cylindrical metal housing by an elastomeric isolator, the retainer plate includes a central opening configured to receive a piston rod.

16. The top mount assembly according to claim 15, wherein the retainer plate is supported within the cylindrical metal housing by two layers of elastomeric material.

17. The top mount assembly according to claim 14, wherein the chamber of the cylinder section and the working piston are annular.

18. The top mount assembly according to claim 17, wherein the working piston protrudes from the cavity of the cylinder section.

19. The top mount assembly according to claim 17, wherein a valve plate is mounted in an end of the piston chamber of the working piston.

20. The top mount assembly according to claim 19, wherein the valve plate includes a plurality of apertures therein.

* * * * *